Dec. 21, 1926.

H. IDOINE 1,611,750

DUMP CAR DOOR LOCK

Filed Dec. 12, 1924

Inventor

*Harry Idoine*

By *Frease and Bond*

Attorneys

Patented Dec. 21, 1926.

1,611,750

UNITED STATES PATENT OFFICE.

HARRY IDOINE, OF CANTON, OHIO.

DUMP-CAR DOOR LOCK.

Application filed December 12, 1924. Serial No. 755,440.

This invention relates to locks for the doors of dump cars and the objects of the improvement are to provide a locking device which will positively lock the door of the dump hopper and hold the same tightly locked, preventing the locking mechanism from being accidentally opened by the jarring or jolting movement of the car; means being provided upon the locking mechanism for the insertion of a bar or the like to quickly and readily move the parts into the locked position, an eccentric cam being provided for frictional engagement with the lock bar for retaining the same in locked position.

The above and other objects may be attained by constructing the lock in the manner illustrated in the accompanying drawing, in which—

Figure 2:
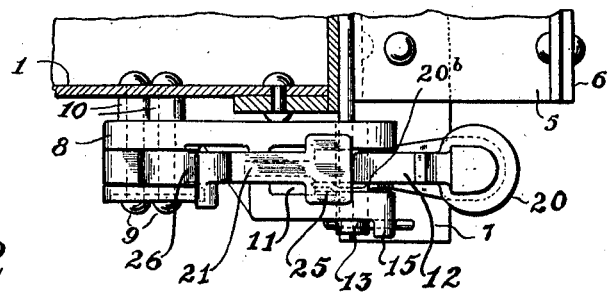
Figure 1:
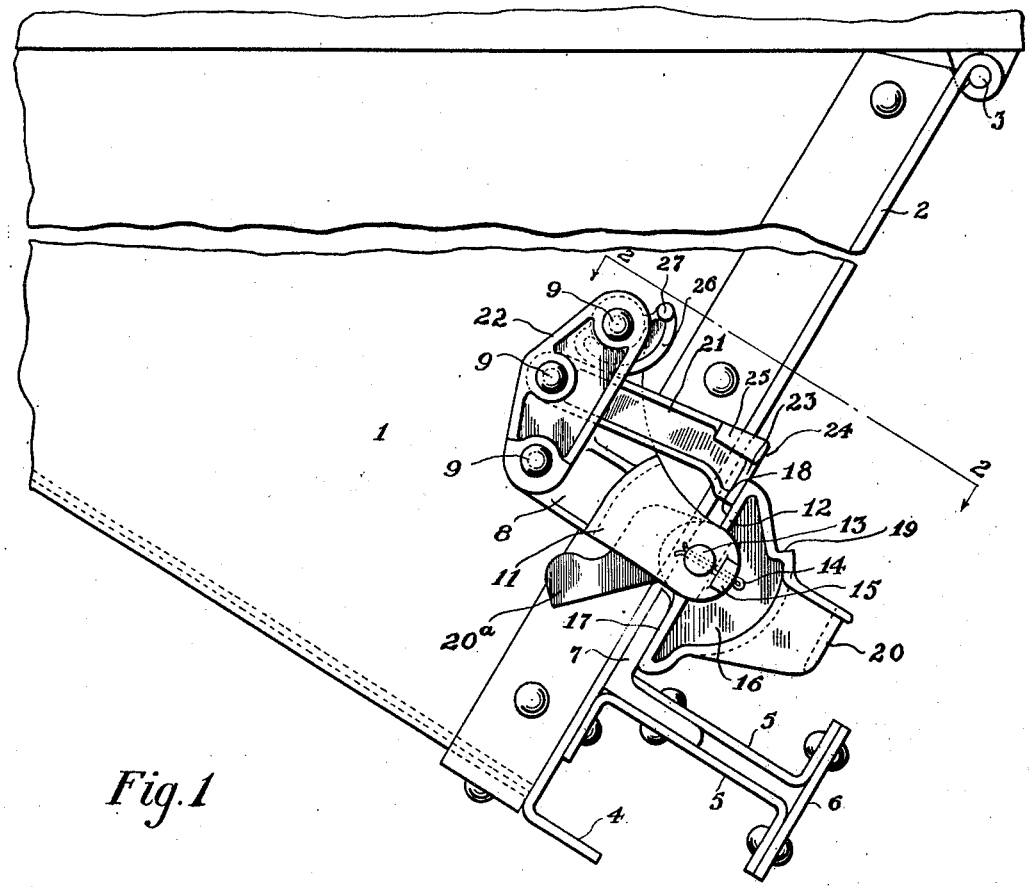

Figure 1 is a side elevation of the improved locking device showing the same in locked position upon a hopper door; and Fig. 2, a section on the line 2—2, Fig. 1.

Similar numerals refer to similar parts throughout the drawing.

A portion of the dump hopper of the usual dump car is shown at 1, the door 2 thereof being shown hinged at its upper end to the frame of the car as shown at 3. The door may be stiffened and reinforced in any usual manner as by providing the angular flange 4 at its lower edge and attaching the channel irons 5 to the lower portion of the door and connecting the same as by the plate 6.

The angle iron 7 is connected to the channels 5 and extends outward beyond the edge of the door for engagement with the improved locking mechanism to which the invention pertains.

The lock is carried upon a plate 8 connected to the side of the hopper as by rivets 9, bosses or thimbles 10 being preferably provided upon the inner side of the plate for spacing the same away from the side wall of the hopper, the rivets being locked through said bosses, as shown in Fig. 2.

The free lower end portion of the plate 8 is bifurcated as shown at 11 and the locking member 12 is pivoted therein as by the pin 13, a cotter pin 14 passing through the outer end of said pin and through an ear 15 upon the bifurcated portion of the plate.

The pivoted locking member 12 is provided with a substantially semicircular portion 16 having the one radial edge 17 for engagement with the angle iron 7 upon the door and the diametrically opposite radial edge 18 for engagement with the lock bar, as will be hereinafter described, a shoulder 19 being provided in the peripheral portion of the locking member to retain the door in partial closed position in the event that the door does not entirely close in the initial closing movement.

A tubular boss 20 is formed upon the peripheral portion of the locking member and an angular arm $20^a$ is formed integral with the locking member and normally extends in a substantially horizontal position across the side of the hopper, this arm being provided to be struck by the angle iron 7 when the door is closed, moving the pivoted locking member into the locked position. The spring washer $20^b$ is provided to counterbalance the weight of the semicircular portion of the pivoted locking member and hold the same in the unlocked position when the door is swung open.

A lock bar 21 is pivoted upon the central rivet 9 which attaches the plate 8 to the hopper, a plate 22 being preferably spaced from the plate 8 covering the pivotal point of the lock bar and connected by means of the rivets 9.

The free end of the lock bar is provided with a head 23 having a flat face 24 for engagement with the flat face 18 of the pivoted locking member and a lug or projection 25 may be provided upon each side of the head for quickly raising the same when it is desired to unlock the door.

For the purpose of positively locking the lock bar in locked position, an eccentric cam 26 is pivoted upon the upper rivet 9 and arranged to frictionally engage the upper edge of the lock bar.

By driving this eccentric cam down into place, it will be seen that the lock bar is wedged tightly against the face 18 of the pivoted locking member, holding the face 17 thereof tightly against the angle iron 7, thus clamping the door in locked position.

A boss or lug 27 may be provided upon the eccentric cam 26 for quickly releasing the same when it is desired to unlock the door.

Assuming the door to be in the unlocked position, when it is desired to lock the same, the door is swung toward the hopper, the angle iron 17, striking the arm $20^a$ and swinging the locking member 12 back toward the position shown in Figure 1 and the lock bar 21 rides over the peripheral surface of the locking member 12 and drops into engagement with the radial face 18 thereof, holding the parts in the locked position shown in Figure 1.

It frequently happens that the pivoted member is not swung back to the locked position far enough to permit the lock bar to engage the flat face 18 thereof, the head of the bar resting upon the peripheral portion of the pivoted locking member against the shoulder 19 and retaining the door in partial closed position.

To quickly throw the parts in locked position, a bar may be inserted in the tubular boss 20 and used as a lever to quickly throw the pivoted locking member into the position shown in Fig. 1, when the lock bar may be forced down into place and the eccentric cam swung upon its pivot to frictionally engage the lock bar and hold the same in locked position.

To unlock the door, the eccentric cam 26 is swung upon its pivot to release the lock bar, which is then swung upward, upon its pivot, out of engagement with the flat face 18 of the locking member, permitting the door to be swung open.

I claim:—

1. In combination with a dump car hopper and a door hinged thereto and provided with a flange at one side, a lock for the door comprising a locking member pivoted to the side of the hopper and arranged to engage said flange upon the door said locking member having a peripheral face and a flat face, a lock bar pivoted upon the hopper and arranged to ride upon the peripheral face of the locking member and to engage said flat face of the pivoted locking member and a cam for engagement with the lock bar.

2. In combination with a dump car hopper and a door hinged thereto and provided with a flange at one side, a lock for the door comprising a locking member pivoted to the side of the hopper and arranged to engage said flange upon the door, said locking member having a peripheral face and a flat face, a lock bar pivoted upon the hopper and arranged to ride upon the peripheral face of the locking member and to engage said flat face of the pivoted locking member and an eccentric cam pivoted upon the hopper for engagement with the lock bar.

3. In combination with a dump car hopper and a door hinged thereto and provided with a flange at one side, a lock for the door comprising a locking member pivoted to the side of the hopper and arranged to engage said flange, a lock bar pivoted upon the hopper and arranged to engage the locking member and a tubular boss upon the pivoted locking member for the reception of a bar to rock the pivoted locking member into locked position.

4. In combination with a dump car hopper and a door hinged thereto and provided with a flange at one side, a lock for the door comprising a locking member pivoted to the side of the hopper and arranged to engage said flange upon the door, an arm upon the pivoted locking member arranged to be engaged by said flange when the door is closed to move the locking member into locked position and a lock bar upon the hopper arranged to hold the pivoted locking member in locked position.

5. In combination with a dump car hopper and a door hinged thereto and provided with a flange at one side, a lock for the door comprising a locking member pivoted to the side of the hopper and arranged to engage said flange upon the door, said locking member having a peripheral face and a flat face, a lock bar pivoted upon the hopper and arranged to ride upon the peripheral face of the locking member and to engage said flat face of the pivoted locking member and a shoulder upon the flat face of the pivoted locking member for engagement with the lock bar to retain the door in partial closed position in the event the door does not close tightly.

6. In combination with a dump car hopper and a door hinged thereto and provided with a flange at one side, a lock for the door comprising a locking member pivoted to the side of the hopper and arranged to engage said flange upon the door, a lock bar pivoted upon the hopper and arranged to engage said pivoted locking member and a spring washer for holding the pivoted locking member in unlocked position when the door is opened.

In testimony that I claim the above, I have hereunto subscribed my name.

HARRY IDOINE.